United States Patent
Richardson

(10) Patent No.: US 7,987,362 B2
(45) Date of Patent: *Jul. 26, 2011

(54) METHOD AND APPARATUS FOR USING IMPERFECTIONS IN COMPUTING DEVICES FOR DEVICE AUTHENTICATION

(75) Inventor: Ric B. Richardson, Irvine, CA (US)

(73) Assignee: Uniloc USA, Inc., Irvine, CA (US)

( * ) Notice: Subject to any disclaimer, the term of this patent is extended or adjusted under 35 U.S.C. 154(b) by 1154 days.

This patent is subject to a terminal disclaimer.

(21) Appl. No.: 11/531,257

(22) Filed: Sep. 12, 2006

(65) Prior Publication Data

US 2007/0126550 A1    Jun. 7, 2007

Related U.S. Application Data

(60) Provisional application No. 60/716,420, filed on Sep. 12, 2005.

(51) Int. Cl.
  H04L 9/32 (2006.01)
  G06F 11/00 (2006.01)
  G06F 12/14 (2006.01)
  G11C 29/00 (2006.01)

(52) U.S. Cl. ......... 713/168; 713/193; 713/194; 714/25; 714/718

(58) Field of Classification Search .............. None
  See application file for complete search history.

(56) References Cited

U.S. PATENT DOCUMENTS

| | | | | |
|---|---|---|---|---|
| 6,536,005 | B1 * | 3/2003 | Augarten | 714/723 |
| 7,463,945 | B2 * | 12/2008 | Kiesel et al. | 700/174 |
| 7,653,899 | B1 * | 1/2010 | Lindahl et al. | 717/128 |
| 2005/0138155 | A1 * | 6/2005 | Lewis | 709/223 |
| 2007/0239606 | A1 | 10/2007 | Eisen | |

FOREIGN PATENT DOCUMENTS

WO    WO 98/42098    9/1998

OTHER PUBLICATIONS

"Technical Details on Microsoft Product Activation for Windows XP," Internet Citation, XP002398930, Aug. 13, 2001.

* cited by examiner

*Primary Examiner* — Nasser Moazzami
*Assistant Examiner* — Fatoumata Traore
(74) *Attorney, Agent, or Firm* — Sean D. Burdick

(57) ABSTRACT

A method for authenticating a device including the steps of operating the device to create at least one failure condition; obtaining a measurement based on the at least one failure condition; and, comparing the measurement based on the at least one failure condition with a previously stored measurement based on the at least one failure condition to determine an identity of the device. An apparatus and an article of manufacture for authenticating a device is also disclosed.

13 Claims, 3 Drawing Sheets

METHOD AND APPARATUS FOR USING IMPERFECTIONS IN COMPUTING DEVICES FOR DEVICE AUTHENTICATION

CLAIM OF PRIORITY UNDER 35 U.S.C. §119

The present Application for Patent claims priority to Provisional Application No. 60/716,420, entitled "Method for using imperfections and irregularities in computing and digital storage devices for the purposes of device authentication" filed Sep. 12, 2005, and assigned to the assignee hereof and hereby expressly incorporated by reference herein.

BACKGROUND

1. Field

The present invention relates generally to security in computing environments, and more particularly, to a method and apparatus for using imperfections in computing devices for device authentication.

2. Background

A basic component of any security system is the authentication of not only the sender and receiver of secure communications or data, but also the devices that are used as part of the storage and communications process. Computing and digital storage devices have become commonplace for processing, storing and communicating digital information. In recent years, it has been a focus of the computing industry to make such devices secure.

One approach to securing devices is the introduction of secure components that have had a unique identity intentionally embedded into the components. These secure components are known in the art as "dongles." Another approach is to embed a unique identifier into the component itself. An example of this in the art is the use of a secure computing platforms where the main central processing unit (CPU), or "processor," features a hard coded serial number or encryption certificate that cannot be changed or modified after manufacture. Another example that is also currently in the art is hard disk serialization, where a unique number is permanently added or written to the hard disk for reference by the operating system.

One disadvantage of the above approaches to digital security and authentication is that the intentional predetermined identification of a device, such as by the use of a manufactured identifier or serialization number, is a specific and easily traced means of identification. This means that attackers and or reverse engineers have a specific and quantifiable target to initiate an attack on the security system.

Another disadvantage is the cost of manufacturing for coupling the manufactured identifiers to the medium to be protected or authenticated. Considerable effort and expense is usually associated with ensuring the manufactured identifiers cannot be separated from the computing or digital storage device. In the art much of the expense is associated with writing software that forces the data to verify the presence of and authenticate the manufactured identifier. Since the invention uses identifying information that is already present and measurable in the media or fiber to be protected, the cost of such authentication and identification process is greatly reduced.

SUMMARY OF THE PREFERRED EMBODIMENTS

The present invention provides a method for authenticating a computing device. In one preferred embodiment of the present invention, the method includes the steps of operating the device to create at least one failure condition; obtaining a measurement based on the at least one failure condition; and, comparing the measurement based on the at least one failure condition with a previously stored measurement based on the at least one failure condition to determine an identity of the device.

An apparatus for authenticating a device is also disclosed. The apparatus includes a processor and a memory coupled to the processor. In one preferred embodiment, the memory is configured to cause the processor to execute a method including the steps of operating the device to create at least one failure condition; obtaining a measurement based on the at least one failure condition; and, comparing the measurement based on the at least one failure condition with a previously stored measurement based on the at least one failure condition to determine an identity of the device.

An article of manufacture including a computer-readable medium having instructions stored thereon for causing a processor to perform a method for authenticating a device is also disclosed. The method including the steps of operating the device to create at least one failure condition; obtaining a measurement based on the at least one failure condition; and, comparing the measurement based on the at least one failure condition with a previously stored measurement based on the at least one failure condition to determine an identity of the device.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Computing devices, including such devices as processors and digital storage devices, possess a wide range of device variations. Such variations are commonly used to evaluate devices for quality assurance purposes and often dictate whether a particular device is of a quality level to be sold or should be discarded/recycled.

Various quality assurance and measurement tests may be used to qualify devices for sale within one of many levels of grading of devices. For example, the maximum speed at which a processor operates is often used to classify the processor.

The approach described by the present invention allows a wide and diverse range of identifiers to be used to uniquely identify a protected computing device. The use of a wide and diverse range of identifiers significantly complicates the initial stages of any attacking or tampering process in that there is no central and easily identifiable identification component or serial number to attack.

The present invention allows the device itself to be used as part of the authentication process and thereby reduces or eliminates the cost and time involved with adding and securing a separate identity token (e.g., dongle) to the device to be secured or authenticated.

The present invention further capitalizes on the natural occurrence of many and varied imperfections and irregularities in the devices created both during the manufacturing process and the subsequent day-to-day operation. The imperfections and irregularities may be used for developing unique identities that are hard to reproduce by attackers of authentication and security systems.

In one preferred embodiment of the present invention, results from damage detection tests that may be currently used by computing device manufacturers are used to develop a unique profile for a device. The unique profile can then be used for authentication in security, copy control and access control applications.

Figure 1:
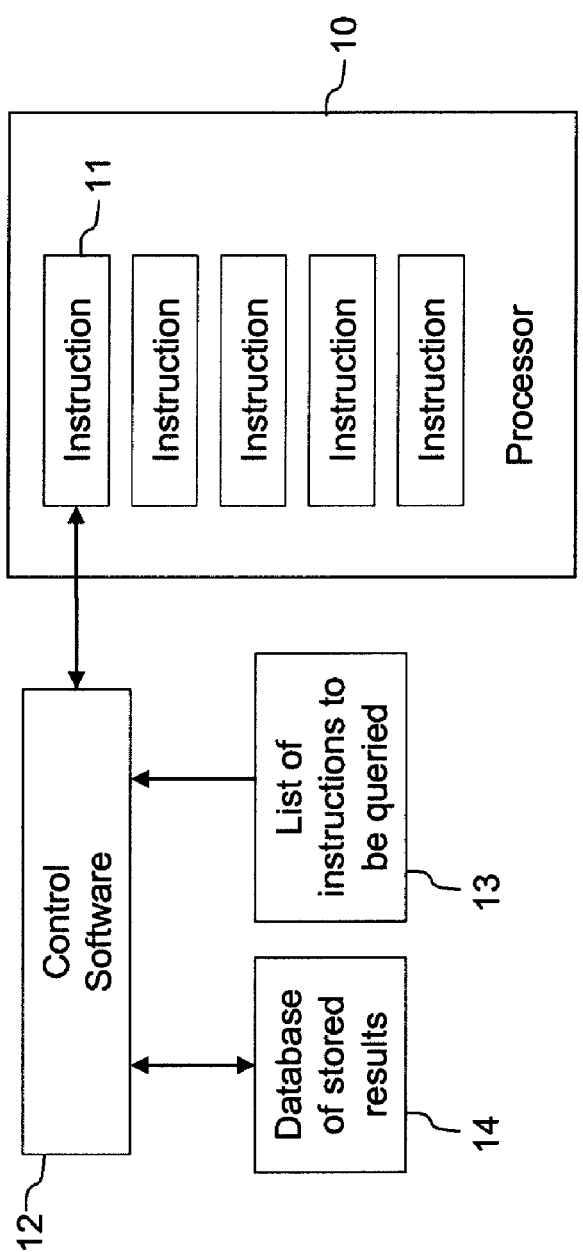
FIG. 1 is a block diagram of an identification system configured in accordance with one preferred embodiment of the present invention.

FIG. 1 shows a block diagram of an identification system configured in accordance with one preferred embodiment of the present invention. A control software 12 is used for testing a computing device 10. In one preferred embodiment, the specific testing is achieved by the control software 12 querying computing device 10 using a list of processor-specific instructions 11 (i.e., the instructions that the computing device 10 can execute). The control software 12 uses a list of processor instructions 13 to explore the capabilities of the computing device 10. The results of the testing are stored in a database of results 14. As further described herein, the database of results 14 is also used by the control software 12 in a comparison of the test results obtained from the use of the list of processor-specific instructions 11 for the targeted computing device 10 (e.g., a processor) with other tests previously performed on other separate and unique computing devices (i.e., other processors). The test results that are determined to be separate and unique to the computing device 10 (i.e., the computing device currently being tested) can be used to uniquely identify the computing device 10.

Figure 2:
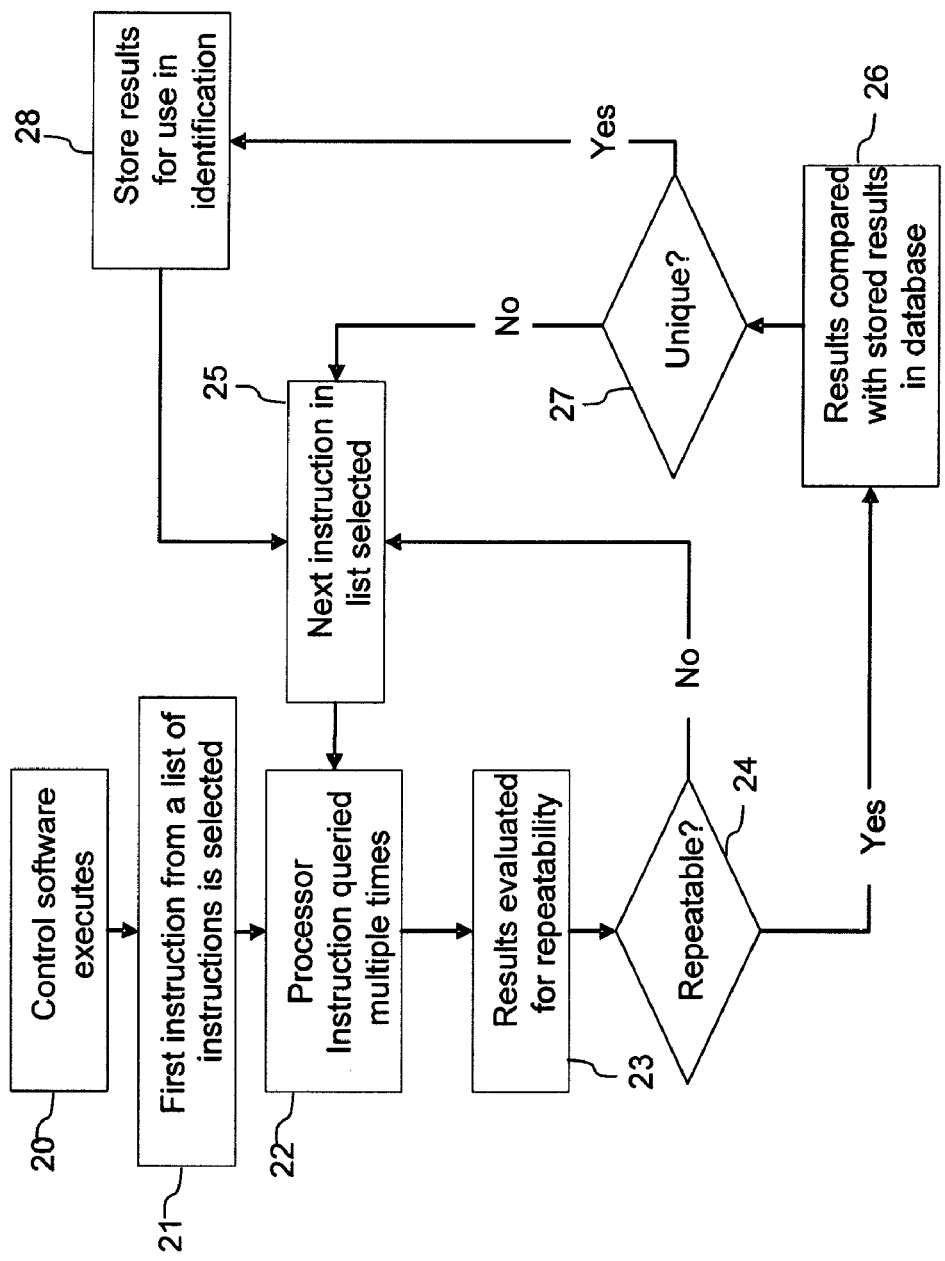
FIG. 2 illustrates an identification process that can be used to uniquely identify a computing device in accordance with one preferred embodiment of the present invention; and, FIG. 3 illustrates a failure condition capture process configured in accordance with one preferred embodiment of the present invention.

FIG. 2 illustrates an exemplary process that can be used to obtain unique information from a computing device to be used for the purposes of identifying the computing device. The description of FIG. 2 will be accomplished with reference to the components described in FIG. 1.

Initially, the control software 12 is executed in step 20. In one preferred embodiment, the first processor instruction is selected from the list of processor instructions in step 21 and the control software 12 executes the processor instruction as part of a query in step 22 that is executed multiple times in succession. The results from these queries are compared and evaluated for changes in step 23. If the test results cannot be repeated with sufficient accuracy for delivering a repeatable and consistent result, as determined in step 24, the control software 12 selects the next processor instruction to be tested 25 from list of processor instructions 13. In one embodiment, for a test result to be repeated with sufficient accuracy, the measured value returned from each test must be equal from test to test. In another preferred embodiment, the measured value returned from each test must be within a particular range. In other preferred embodiments, various tolerances may be used to indicate that the test result is repeatable or reproducible with sufficient accuracy.

If the test results can be repeated with sufficient accuracy for delivering repeatable and consistent results in step 24, the control software 12 will compare the results of the test with the database of stored results 14 from other computing devices in step 26.

If the results from the comparison show that the test results are unique to the computing device being tested (i.e., computing device 10) in step 27, the control software 12 stores the results of the test for use in identifying the computing device in the future. The control software 12 then selects the next processor instruction to be tested in step 25 from the list of processor instructions used by the control software 12.

Referring still to FIG. 2, an operation of the identification process of the present invention follows, where the test program 12 runs a series of computational processes through the computing device 10 in step 22. The results of each individual test are evaluated in step 23. The results are measured in terms of how many times an instruction from, for example, the list of processor instructions 11 fails when executed by the computing device 10 for a predetermined number of executions (e.g., the duration of the loop in step 32) or, conversely, how many times computing device 10 successfully executes an instruction either: 1) before the processor instruction produces a failed result, also referred to as a "failure condition;" or, 2) in total as compared to the predetermined number of executions. These results are then tabulated in step 23 that can be used by an authentication software, which can also be control software 12, to evaluate the test results for repeatability in step 24. These results are then compared with the database of stored results from other computing devices in step 26. If the device test results and timings are unique and repeatable on the device being tested, as determined in step 27, the authentication software stores the results in step 28 and uses the test results and timings as the foundation of a device identity token that can be compared with the target device in the future to verify the identity of the computing device 10.

Figure 3:
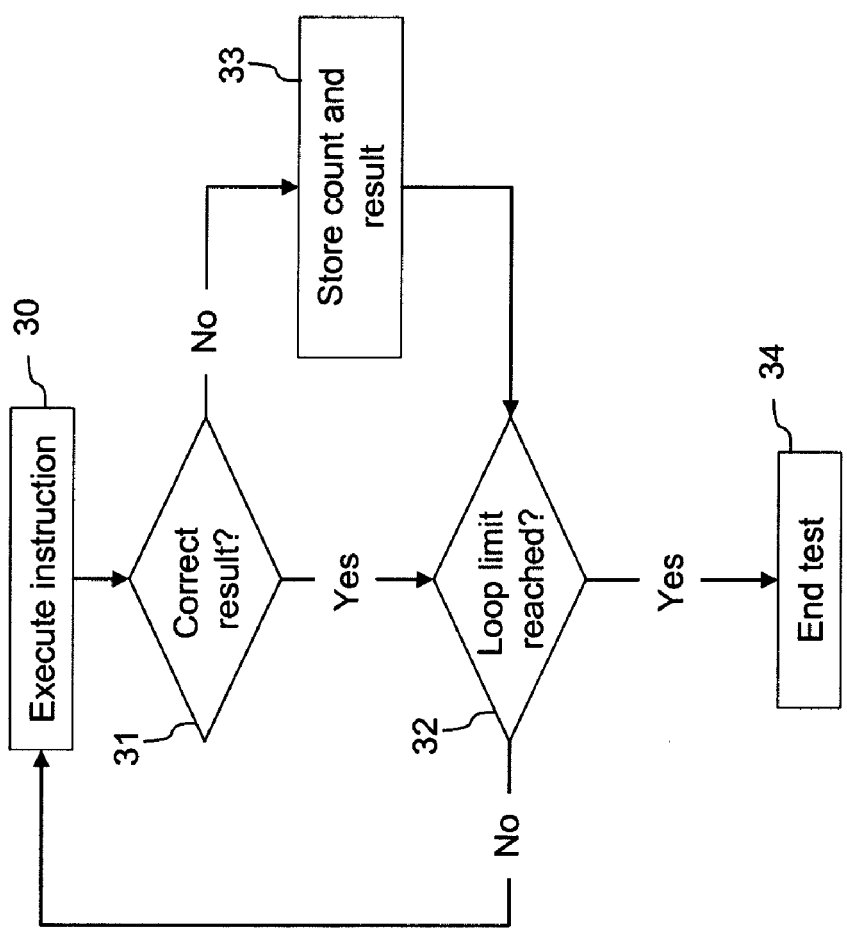

FIG. 3 illustrates an exemplary process of testing a processor instruction or group of instructions. In one preferred embodiment of the present invention, this process could be included as a sub-process of the process described in FIG. 2. Specifically, the process could be implemented at the step where the processor instruction is queried multiple times at step 22. As illustrated in FIG. 3, a processor instruction is executed at step 30 and the results evaluated at step 31. If the result is a correct result, as expected by the manufacturer of the processor, then a counter is queried to check if the loop or repeat count of the process is exceeded at step 32. If the loop count is not exceeded then the process returns to execute the same processor instruction again at step 30. If the result of the processor instruction is not the result expected by the manufacturer of the processor then the failed result is stored along with the count of the number of tests completed before the failure occurred at step 33. In one preferred embodiment of the present invention, if the loop count is not exceeded the process returns to execute the same processor instruction in step 30 again. If the loop count as determined in step 32 has been exceeded then the test ends at step 34.

In one preferred embodiment of the present invention, as discussed herein, the identification of the processor is based on how many times the processor fails the execution of a particular processor instruction within a loop count. In another preferred embodiment of the present invention, the processor may be identified by the amount of time it takes the processor to reach a particular failure condition. Thus, in general, the measurements taken in the present invention are based on the failure condition for the computing device.

Although the exemplary system and process discussed above is with reference to a processor as computing device 10, other computing devices such as digital storage devices or other components may be used. For example, in another preferred embodiment of the present invention, the same process is applied to digital storage devices, where damage detection tests are performed on the storage media of the digital storage devices. In one embodiment, rather than using a series of targeted computational problems as in the evaluation of a computing device, damage detection and evaluation tests of digital storage devices would involve the reading writing and transferring of data across multiple addresses within the storage device.

It should be noted that the methods described herein may be implemented on a variety of communication hardware, processors and systems known by one of ordinary skill in the art. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A method encoded on a data storage medium as executable software for authenticating a computing device, the method comprising steps of:
    querying an unidentified computing device with a data processing instruction known to induce a unique failure condition on another computing device;
    obtaining a measurement from the unidentified computing device in response to the querying step, the measurement based on a failure condition induced on the unidentified computing device by the data processing instruction;
    comparing the measurement to a stored measurement, the stored measurement based on the unique failure condition induced by the data processing instruction on the other computing device; and
    verifying, based on the comparing step, whether the unidentified computing device matches the other computing device;
    the steps performed by a processor identification system executing the software.

2. The method of claim 1, further comprising:
    selecting the processing instruction from a plurality of processing instructions.

3. The method of claim 1, wherein the querying step further comprises:
    querying the unidentified computing device with the processing instruction a plurality of times;
    wherein the obtaining step further comprises obtaining a measurement from the unidentified computing device each time the unidentified computing device is queried;
    wherein the comparing step further comprises comparing each measurement to the unique failure condition; and
    wherein the verifying step further comprises verifying whether the unidentified computing device is the particular computing device based on an expected number of occurrences of the unique failure condition.

4. The method of claim 1, wherein the querying step further comprises:
    querying the unidentified computing device with the processing instruction a plurality of times;
    wherein the obtaining step further comprises obtaining a measurement from the unidentified computing device each time the unidentified computing device is queried;
    wherein the comparing step further comprises comparing each measurement to the unique failure condition; and
    wherein the verifying step further comprises verifying whether the unidentified computing device is the particular computing device based on how many times the querying step is executed before the comparing step matches a measurement to the unique failure condition.

5. The method of claim 1, wherein the querying step further comprises:
    querying the unidentified computing device with the processing instruction a plurality of times;
    wherein the obtaining step further comprises obtaining a measurement from the unidentified computing device each time the unidentified computing device is queried;
    wherein the comparing step further comprises comparing each measurement to the unique failure condition; and
    wherein the verifying step further comprises verifying whether the unidentified computing device is the particular computing device based on how many times the comparing step matches a measurement to the unique failure condition.

6. The method of claim 1, wherein the computing device comprises a processor.

7. The method of claim 1, wherein the computing device comprises a digital storage device.

8. The method of claim 1, wherein the measurement is based on time.

9. An apparatus for authenticating a device comprising:
a processor;
a memory coupled to the processor, the memory configured to cause the processor to execute a method comprising steps of:
   querying an unidentified computing device with a data processing instruction known to induce a unique failure condition on another computing device;
   obtaining a measurement from the unidentified computing device in response to the querying step, the measurement based on a failure condition induced on the unidentified computing device by the data processing instruction;
   comparing the measurement to a stored measurement, the stored measurement based on the unique failure condition induced by the data processing instruction on the other computing device; and
   verifying, based on the comparing step, whether the unidentified computing device matches the other computing device.

10. An article of manufacture comprising a non-transitory computer-readable medium having instructions stored thereon for causing a processor to perform a method for authenticating an unidentified device, the method comprising steps of:
   querying the unidentified device with a data processing instruction known to induce a unique failure condition on another computing device;
   obtaining a measurement from the unidentified device in response to the querying step, the measurement based on a failure condition induced on the unidentified computing device by the data processing instruction;
   comparing the measurement to a stored measurement, the stored measurement based on the unique failure condition induced by the data processing instruction on the other computing device; and
   verifying, based on the comparing step, whether the unidentified device matches the other computing device.

11. A method for determining unique identity for a computing device, comprising steps of:
   running on the computing device a computational process executable by the computing device;
   evaluating a response of the computing device to the computational process;
   determining a failure condition resulting from the evaluating step;
   verifying repeatability of the failure condition;
   comparing the failure condition to known failure conditions that resulted from other computing devices that ran the computational process; and
   defining a device identity token for the computing device based on the failure condition if the comparing step determines that the failure condition is unique.

12. The method of claim 11 wherein the verifying step comprises repeating the running, evaluating, and determining steps a number of times, comparing results of the determining steps, and verifying repeatability if the results are identical.

13. The method of claim 11 wherein the verifying step comprises repeating the running, evaluating, and determining steps a number of times, comparing results of the determining steps, and verifying repeatability if the failure condition occurs according to a predictable frequency.

* * * * *